US011809866B2

(12) United States Patent
Culibrk et al.

(10) Patent No.: US 11,809,866 B2
(45) Date of Patent: *Nov. 7, 2023

(54) SOFTWARE CHANGE TRACKING AND ANALYSIS

(71) Applicant: Electronic Arts Inc., Redwood City, CA (US)

(72) Inventors: Milan Culibrk, Coquitlam (CA); Edward Kilham, North Vancouver (CA); Jeffrey E. Skelton, West Kelowna (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,469

(22) Filed: Aug. 12, 2021

(65) Prior Publication Data

US 2021/0373885 A1 Dec. 2, 2021

Related U.S. Application Data

(63) Continuation of application No. 16/559,111, filed on Sep. 3, 2019, now Pat. No. 11,106,460.

(51) Int. Cl.
*G06F 9/44* (2018.01)
*G06F 8/77* (2018.01)
(Continued)

(52) U.S. Cl.
CPC .................. *G06F 8/77* (2013.01); *G06F 8/71* (2013.01); *G06F 8/73* (2013.01)

(58) Field of Classification Search
CPC ....................................................... G06F 8/77
(Continued)

(56) References Cited

U.S. PATENT DOCUMENTS 6,993,710 B1 * 1/2006 Coad .................. G06F 8/77
715/767
7,861,229 B2 12/2010 Lammel et al.
(Continued)

OTHER PUBLICATIONS

Junior et al., "Tolerance to Complexity: Measuring Capacity of Development Teams to Handle Source Code Complexity", IEEE International Conference on Systems, Man, and Cybernetics, SMC 2016, Oct. 2016, 6 pgs.
(Continued)

*Primary Examiner* — Francisco J Aponte
(74) *Attorney, Agent, or Firm* — Lee & Hayes, P.C.

(57) ABSTRACT

A change tracking and analytics system and method receives software code blocks from one or more repositories of software related to a software project, such as a new video game. Changes associated with software code blocks, such as relative to previous versions of the software code blocks, may be determined and logged. Additionally, various analytics, such as metrics associated with complexity, divergence from a master version of software code blocks, and/or any cascading effects of the software code blocks may be generated and stored in association with the software code blocks. The change information and analytics may then be used to generate any variety of reports indicating complexity, divergence, or the like over time, information related to software code blocks, and/or information related to behavior of software teams. The change information may also be used to make changes to allocated resources, such as quality assurance resources and/or software engineering resources.

15 Claims, 9 Drawing Sheets

(51) Int. Cl.
*G06F 8/73* (2018.01)
*G06F 8/71* (2018.01)

(58) Field of Classification Search
USPC .......................................................... 717/101
See application file for complete search history.

(56) References Cited

U.S. PATENT DOCUMENTS

| | | | |
|---|---|---|---|
| 8,458,663 B2 | 6/2013 | Carteri et al. | |
| 8,561,021 B2 | 10/2013 | Muharsky et al. | |
| 8,589,880 B2 | 11/2013 | Jones et al. | |
| 8,627,287 B2 | 1/2014 | Fanning et al. | |
| 8,762,784 B1 | 6/2014 | Portal et al. | |
| 8,959,486 B2 | 2/2015 | Bostick et al. | |
| 8,990,764 B2 | 3/2015 | Armstrong et al. | |
| 9,092,211 B2 | 7/2015 | Ng et al. | |
| 9,170,783 B1* | 10/2015 | Orofino, II | G06F 8/33 |
| 9,317,408 B2 | 4/2016 | Szpak | |
| 9,342,285 B2 | 5/2016 | Li | |
| 9,495,147 B2 | 11/2016 | Chen et al. | |
| 9,785,432 B1 | 10/2017 | Wright | |
| 9,916,134 B2* | 3/2018 | Charisius | G06F 8/20 |
| 10,102,105 B2* | 10/2018 | Shani | G06F 11/3608 |
| 10,282,280 B1 | 5/2019 | Gouskova et al. | |
| 10,303,517 B1 | 5/2019 | Sloyan et al. | |
| 10,331,437 B2 | 6/2019 | Boss et al. | |
| 10,338,986 B2 | 7/2019 | Grealish et al. | |
| 10,402,193 B2 | 9/2019 | Boss et al. | |
| 10,459,695 B2 | 10/2019 | Hauser | |
| 10,579,350 B2* | 3/2020 | Bean | G06F 9/4881 |
| 10,606,573 B2 | 3/2020 | Apte et al. | |
| 10,740,216 B1 | 8/2020 | Parent | |
| 10,831,899 B2 | 11/2020 | Bezzi et al. | |
| 10,853,231 B2 | 12/2020 | Guenther et al. | |
| 10,929,125 B2* | 2/2021 | van Schaik | G06F 8/751 |
| 10,936,478 B2* | 3/2021 | Meibusch | G06F 11/3676 |
| 11,068,379 B2* | 7/2021 | Aoki | G06F 11/3616 |
| 11,086,619 B2* | 8/2021 | Sharma | G06F 11/3688 |
| 11,321,081 B2* | 5/2022 | Liang | G06F 8/70 |
| 11,392,375 B1* | 7/2022 | Serna | G06F 8/71 |
| 11,507,908 B2* | 11/2022 | Singh | G06N 20/10 |
| 2007/0027810 A1* | 2/2007 | Longnecker | G06Q 10/10 705/51 |
| 2007/0136622 A1 | 6/2007 | Price et al. | |
| 2008/0320457 A1 | 12/2008 | King et al. | |
| 2009/0037775 A1 | 2/2009 | Chi et al. | |
| 2011/0022551 A1* | 1/2011 | Dixon | G06F 11/3616 706/12 |
| 2013/0311968 A1* | 11/2013 | Sharma | G06F 11/3692 717/101 |
| 2017/0242672 A1 | 8/2017 | Bean et al. | |
| 2018/0121331 A1 | 5/2018 | Cmielowski et al. | |
| 2018/0276562 A1 | 9/2018 | Woulfe et al. | |
| 2019/0079759 A1 | 3/2019 | Kadam | |
| 2019/0317885 A1* | 10/2019 | Heinecke | G06F 11/3616 |
| 2019/0361795 A1 | 11/2019 | Cole et al. | |
| 2019/0377666 A1 | 12/2019 | Klein | |
| 2020/0042418 A1 | 2/2020 | Kihneman et al. | |
| 2020/0150941 A1* | 5/2020 | Bean | G06F 9/4881 |
| 2020/0234346 A1 | 7/2020 | Venkateswaran et al. | |
| 2020/0310948 A1 | 10/2020 | Culibrk et al. | |
| 2020/0387387 A1* | 12/2020 | Iijima | G06F 8/36 |
| 2021/0004311 A1* | 1/2021 | Bhide | G06F 11/3608 |
| 2021/0064364 A1 | 3/2021 | Culibrk et al. | |

OTHER PUBLICATIONS

Office Action for U.S. Appl. No. 16/559,111, dated Mar. 15, 2021, Culibrk, "Software Change Tracking and Analysis", 13 Pages.
Office Action for U.S. Appl. No. 16/559,111, dated Oct. 15, 2020, Culibrk, "Software Change Tracking and Analysis", 11 Pages.
Sariman, et al., "A Novel Approach to Determine Software Security Level using Bayes Classifier via Static Code Metrics", ELEKTRONIKA IR ELEKTROTECHNIKA, Turkey, ISSN, vol. 22, No. 2, 2016, pp. 73-80.
Schmitt et al., "A Complexity and Entropy-based Metric to Calculate Source Code Quality", ResearchGate, Dec. 2018, 24 pgs.
Song, et al., "Which Codes Changes Should you Review First?: A Code Review Tool to Summarize and Prioritize Important Software Changes", Journal of Multimedia Information System, vol. 4, No. 4, Dec. 2017, pp. 255-262.

* cited by examiner

SOFTWARE CHANGE TRACKING AND ANALYSIS

CROSS REFERENCE TO RELATED APPLICATIONS

This application is a continuation of co-pending U.S. patent application Ser. No. 16/559,111 filed Sep. 3, 2019, entitled "Software Change Tracking and Analysis," which is incorporated herein by reference in its entirety.

BACKGROUND

In recent years, as software, and in particular video games, have become more complex, the development of software products often entail multiple individuals (e.g., software developers) across various teams concurrently developing segments of computer code. As different software developers develop and/or update software and/or its constituent code, it becomes increasingly difficult to manage new versions of the software code across the entirety of the software development teams. Changes to software code blocks may have upstream cascading effects and/or downstream cascading effects. For example, changes to arguments (e.g., passed variable) and/or returned values for a modified software code block may affect any upstream software code blocks that make function calls to the modified software code block and/or downstream software code blocks that receive returned values from the modified software code block. Additionally, modification to software code blocks may change the complexity, and therefore, the risk associated with modified software code blocks.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
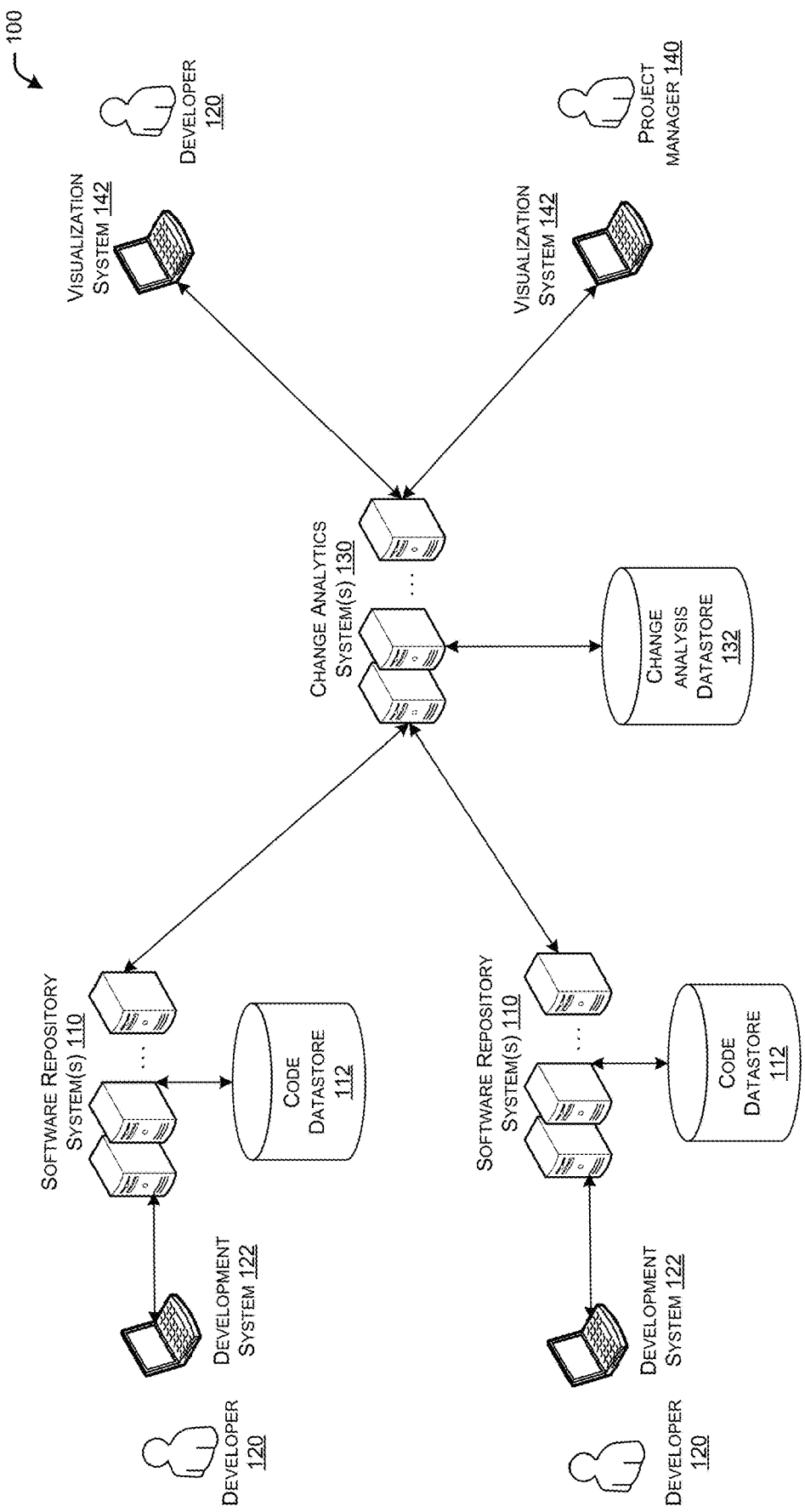
FIG. 1 illustrates a schematic diagram of an example environment with change analytics system(s) to manage software code changes, in accordance with example embodiments of the disclosure.

Example embodiments of this disclosure describe methods, apparatuses, computer-readable media, and system(s) to determine, track, analyze, and/or resource plan for software code changes of a software project, such as for the development of a new video game. According to example embodiments, a change analytics system may determine changes in software code block for a pre-existing software code block. For example, the change analytics system may identify changes made between a first version of a block of code and a modified version of the block of code, as modified by a software developer. Thus, as software developers modify and/or update existing blocks of code and/or generate and/or delete blocks of code, the change analytics system may identify and/or log those changes.

Software code blocks, as also referred to herein as blocks of software code, software code, blocks of code, or computer code, may be any suitable segment of syntactic instructions that may cause one or more computer processors to perform one or more actions and/or functions. The software code blocks may be in any suitable format, such as C++ files, JavaScript files, Python files, etc. The software code blocks may include any suitable file extensions, such as .cpp, .h, .cc, .js, .py, or the like. The software code blocks, in some cases, may include functions that may be called by other software code blocks. For example, a software code block may have arguments representing input values passed to it and/or output results that it passes to other software code blocks.

According to example embodiments, the change analytics system may receive software code blocks, such as new versions of software code blocks and/or newly generated software code blocks. In some cases, the software code blocks may be stored in a single repository from where different developers and/or different teams working on a software project may access the software code blocks associated with the software project. Thus, in this case, the software code blocks (e.g., new software code blocks and/or new versions of software code blocks) may be stored by developers at a central code datastore via a software repository system. The change analytics system may, therefore, be configured to retrieve software code blocks from the code datastore and/or the software repository system. Alternatively, software code may be stored in multiple code datastores and may be accessed via multiple software repository systems, such as at various geographically distributed data centers.

Regardless of how distributed the storage of software code is, the change analytics system may be configured to retrieve the software code from those software repository systems and/or code datastores. In some example embodiments, the change analytics system may query the one or more software repository systems to obtain any new software code. In other example embodiments, the one or more software repository systems may push a notification to the change analytics system indicating that there are/is new software code block(s) available.

The change analytics system may further receive information about a software code block. For example, if a software developer creates a new version of a software code block, he or she may provide a description of changes that he or she has made to the new version of the code block. This type of change log may be stored along with the software code block. The change analytics system may be able to access such descriptions of new software code blocks.

In example embodiments, the software code blocks, as received by the change analytics system, may have embedded information about the software code block, such as the nature of changes in the software code block relative to previous versions of the software code block and/or other related software code blocks. A developer may make comments (e.g., descriptive and/or metadata embedded in the software code that is not executable) within the software code. The change analytics system may access these comments within the software code to determine the nature of the software code blocks. In some cases, the comments in one version of software code blocks may be compared with comments from another version of the software code blocks to generate information about changes in the software code blocks from one version to another version.

The change analytics system may, therefore, access and/or analyze code comments, developer notes, and/or any other metadata associated with a software code block to determine changes from one version of a software code block and another version of the software code block. This type of change information between different versions of a software code block may be logged in association with the software code block, in some cases, along with other information about the software code block. The other information may include information about any application program interface (API) and/or software function block arguments, as well as any analytical data generated about the software code block. Other software code change information that may be logged may include the time of when the software code was generated, the developer who update the software code, and/or the team that updated the software code. The information about the software code block may be stored by the change analytics system in a central database, such as a change analysis datastore.

In addition to logging information about changes in new and/or new version of software code blocks, the change analytics system may be configured to determine one or more analytics and/or metrics associated with the software code block. In some example embodiments, the change analytics system may determine a metric value associated with complexity of a new software code block. For example, the change analytics system may determine a cyclomatic complexity value of a software code block. The cyclomatic complexity value may represent the complexity of a particular software code block based on the number of branches within the software code block, such as branches that may result from if-then code, or other conditional code constructions. In example embodiments, the cyclomatic complexity value, or other suitable complexity metric value, of a software code block may be stored along with other change information about the software code block.

Additionally, in example embodiments, the cyclomatic complexity value of a software code block may be compared, by the change analytics system, to the cyclomatic complexity value of a previous version of the software code block. For example, a change in the cyclomatic complexity may be determined for a software code block relative to previous version(s) of the software code block. This indication of the change in complexity with the new software code block may be stored in association with the new version of the software code block.

In example embodiments, the change analytics system may further determine a divergence complexity value of a software code block. The divergence complexity value may provide a quantitative indication of a cost associated with a software code block diverging from a master version of that software code block. For example, in a video game example, one team may maintain game engine software code. However, if another team wishes to modify a particular code block associated with the game engine, there may be repercussions due to that modification. For example, there may be additional complexity added to the modified code block. Additionally, the modified code block may operate in a manner that affects other software code blocks, either in an upstream fashion (e.g., changes in passed arguments) and/or in a downstream manner where an output is passed to other software code blocks. Thus, the divergence complexity value, as generated by the change analytics system, for a software code block may numerically indicate the additional complexity of a software code block diverging from a controlled version of the software code block, such as a controlled version owned by another software team.

In addition to determining a divergence complexity value of a software code block, the change analytics system may determine a change in the divergence complexity value between different versions of a software code block. The divergence complexity value may enable the budgeting of the cost of change allocated to various software teams of a software project. In example embodiments, the divergence complexity value and/or changes in divergence complexity values may be stored in association with change information and/or analytics of a software code block. In example embodiments, storing this change information associated with a software code block may entail storing this information associated with an identifier of its corresponding software code block (e.g., the name of the software code block).

In example embodiments of the disclosure, the change analytics system may be configured to identify any changes in application programming interfaces (APIs) and/or arguments (e.g., inputs) to a software code block. For example, the change analytics system may be able to determine that a newer version of a software code block may have a different set of arguments, as inputs, relative to a prior version of the software code block. This type of change in the software code blocks may result in any variety of cascading effects, such as upstream effects and/or downstream effects. For example, software code blocks that make function calls to the modified software code blocks may need to be modified if the arguments passed have been changed. Similarly, software code blocks that receive an output from a modified software code block may be affected if the format or nature of the output have been modified due to changes in the software code block.

Although certain changes and metrics are discussed herein, it should be understood that embodiments of the disclosure include any variety of change analysis, including any variety of metrics associated with a software code block. For example, other metrics may include and/or be based upon the number of lines of code, the number of function calls within a software code block, the number of arguments being passed, the number of developers modifying the software code block, the number of different software teams accessing and/or modifying the software code block, the amount of time and/or the number of versions since a related version of the software code block had been tested for quality assurance (QA), etc.

When the change analytics system generates the metric values and stores those analytics, such as in the change analysis datastore, the change analytics system may access the change information to generate one or more reports associated with software code changes for a software project. For example, a project manager and/or developer may be able to query information about software code changes to get an understanding of the changes in the software code of the software project.

In example embodiments, stakeholders, such as developers, project managers, and others, may be able to query and receive a visual indication of changes associated with individual software code blocks, groups of software code blocks, software code blocks associated with specific software teams, and/or an entirety of software code blocks associated with the overall software project. In some cases, the visual data may be formatted by the change analytics system. In other cases, the queried change data may be sent to a visualization system that can then generate visual representations of the change information. Any suitable software, such as POWER BI or other visualization software, may be used to display the change information associated with the software project.

In some cases, metrics may be displayed over a time period for a software project. For example, the sum of the cyclometric complexity change of all new software code blocks may be plotted as a function of time over a certain period of time. This visual display may indicate trends over time in the change in complexity of code associated with the software project. Another example display may include a sum of cyclomatic complexity change for each software team working on the software project. This may show which ones of the software teams are adding high levels of complexity to the software project. Other example displays may show which software code block changes are affecting other software code blocks, such as due to changes in the number or types of arguments. Still other example displays may indicate which software teams may be causing high levels of divergence complexity. Software teams, as discussed herein, may pertain to organizational and/or functional groups of software developers and/or other personnel and resources. For example, a particular video game development project may include a rendering team, an animation team, a character development team, an audio team, a physics team, a game engine team, combinations thereof, or the like.

As discussed herein, the change information (e.g., the descriptions of version changes and/or analytics performed on the new versions of the software code blocks) may be used to make changes to resources allocated to various parts of a software development project. In this way, trends in the ongoing development of the software may provide real-time or near real-time indications of areas that may need additional support and/or resources. For example, areas, sets of software code blocks, and/or software teams that have relatively high levels of increase in complexity may be allocated additional quality assurance (QA) testing resources, such as additional testers and/or testing bandwidth, to check for bugs in the new software code blocks. As another example, areas of development where there are relatively high numbers and impact of software code changes may be allocated additional software developers and/or other personnel to better streamline the use of available resources and be proactive in assigning resources to the greatest current needs. The change information may also be used for planning and budgeting purposes. For example, various software teams of a software project may be allocated a certain amount of divergence complexity budget that they must stay within. This budget can be tracked, such as by a project manager, and if changes are needed to the budget, such changes may be made. In another example, tracking the changes in one software project may provide learning that can be used on other software projects to better allocate resources and/or manage various parts of the software project.

Although examples in the realm of video games and online gaming are discussed herein, it should be understood that the software change analysis methods and systems, as described herein, may be applied to any variety of software applications including other entertainment software, business software, banking software, operating systems, application software, enterprise resource software, cloud management software, mobile device software, scientific software, combinations thereof, or the like.

It should be understood that the systems and methods, as discussed herein, are technological improvements in the field of software development and managing software code block versions. For example, the methods and systems as disclosed herein enables visualizing changes in a software development project, such as for video games, by more tracking changes in software code and/or further generating analytics based on those changes. These improvements manifest in more efficient tracking of software projects, team-level budgeting of complexity and/or divergence complexity, dynamic and/or pro-active resource allocations to various parts of the software development project, and/or better resource allocations for future software development projects. For example, real-time and/or near real-time tracking of software code changes may allow for a more data-driven selection of QA testing activities, where QA testing may be bandwidth limited. As another example, effects of a modification of a software code block may be better understood by finding linkages of that modified software code block to other software code blocks with which the modified software code block interacts. Thus, the disclosure herein provides improvements in the functioning of computers to provide improvements in the technical field of software development, such as video game development. Additionally, the technological problems addressed here are ones that arise in the computer-era and the Internet-era, such as in the fields of distributed software development, online gaming, and video games. Thus, not only is the disclosure directed to improvements in computing technology, but also to a variety of other technical fields related to video games and software development and testing.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with change analytics system(s) 130 to manage software code changes, in accordance with example embodiments of the disclosure. The environment 100 may include one or more software repository system(s) 110 where an organization that is developing software may store a variety of software code blocks. The software repository system(s) 110 may store new software code blocks, such as newly developed software code blocks and/or new versions of software code blocks, in one or more code datastores 112. The code datastore 112 may be accessible by the software project team members, such as developers 120 to access the software code created for a software development project.

The software developers 120, as they create software code on their development systems 122 may provide the software code blocks to the software repository systems 110 to be stored in the code datastore. In this way, new software code blocks are stored so that they can be access by developers 120 at a later time and shared among the developers 120, including among developers 120 from other software teams of the software development project. As new code is sent to software repository systems 110 from any geographical location of the software project development, the new software code may be stored to the code datastore 112.

Although the code datastore 112 and the software repository system 110 are depicted as being distributed in environment 100, it should be understood that in some example embodiments, there may be a single code datastore 112 where all software code blocks may be originally stored, or at least mirrored.

Software code blocks, as referred to herein as blocks of software code, software code, blocks of code, or computer code, as used herein, may be any suitable segment of syntactic instructions that may cause one or more computer processors to perform one or more actions and/or functions. The software code blocks may be in any suitable format, such as C++ files, JavaScript files, Python files, etc. The software code blocks may include any suitable file extensions, such as .cpp, .h, .cc, .js, .py, or the like. The software code blocks, in some cases, may include functions that may be called by other software code blocks. For example, a software code block may have arguments representing input values passed to it and/or output results that it passes to other software code blocks.

According to example embodiments, the change analytics system(s) 130 may receive, from the software repository system(s) 110, software code blocks, such as new versions of software code blocks and/or newly generated software code blocks. As discussed herein, in some cases the software code blocks are stored in a centralized (e.g., physically and/or virtually centralized) location. In other cases, the software code blocks may be stored in multiple geographically distinct locations with separate code datastores 112 and/or separate software repository system(s) 110. Regardless of how the software code blocks are stored (e.g., distributed or localized), the change analytics system(s) 130 may be able to receive the software code blocks. In some cases, the change analytics system(s) 130 may request the software code blocks, and responsive to the request, the software repository system(s) 110 may send the requested software code blocks. In the same or other cases, the software repository system(s) 110 may push the software code blocks to the change analytics system(s) 130 when new software code blocks are available.

The change analytics system(s) 130 may determine changes in software code blocks between two versions of software code blocks. The change analytics system(s) 130 may determine these changes by accessing a variety of information about the different versions of the software code blocks. The change analytics system(s) 130 may further collect, analyze, and/or organize the software code block change information and store the change information associated with an identifier of the software code block (e.g., name of the software code block), such as in a change analysis datastore 132.

One source of information that the change analytics system(s) 130 may harvest and analyze to determine version level changes in software code blocks may be version change log information provided by a developer 120 who generated the change log information when storing his or her software code block on the code datastore 112 via the software repository system(s) 110. Another source of the version level change information may be available with any metadata tags to the software code blocks descriptive of the software code block and/or changes to the software code block from previous version. Yet another source of version level change information may be available from comments (e.g., non-instructional portions of software code blocks) that a developer 120 may have made in the software code block.

Each of these sources of version level change information may be available to the change analytics system(s) 130 and the change analytics system(s) 130 may extract and/or organize this information to create a listing of version level changes from a new version of a software code block. For example, the change analytics system(s) 130 may retrieve any metadata associated with a software code block, such as descriptions of changes provided by a developer 120, from the software repository system(s) 110.

The change analytics system may further receive information about a software code block. For example, if a software developer creates a new version of a software code block, he or she may provide a description of changes that he or she has made to the new version of the code block. This type of change log may be stored along with the software code block. The change analytics system may be able to access such descriptions of new software code. In some example embodiments, the change analytics system(s) 130 may access these comments within the software code to determine the nature of the software code blocks. In some cases, the comments in one version of software code blocks may be compared with comments from another version of the software code blocks to generate information about changes in the software code blocks from one version to another version. The change analytics system may, therefore, access and/or analyze code comments, developer notes, and/or any other metadata associated with a software code block to determine changes from one version of a software code block and another version of the software code block. This type of change information between different versions of a software code block may be logged in association with the software code block, such as in the change analysis datastore 132.

In example embodiments, the change analytics system(s) 130 may further access other information about the software code block and log that information in association with the software code block, such as in the change analysis datastore 132. This information may include a time when the software code block was created and/or uploaded to the code datastore 112, an identifier (e.g., name) of a developer 120 who developed the software code block, a team identifier (e.g., name) that developed the software code block, etc.

The change analytics system(s) 130 may further analyze the software code block, in example embodiments of the disclosure, to generate one or more analytical data (e.g., various metrics) that are descriptive of the software code block. These analytics may include, for example, metrics associated with the complexity of the software code block, the effects of the software code blocks on other parts (e.g., other code blocks) of the software development project, and/or the cost of diverging from master software code blocks, such as master software code blocks maintained by a particular software team (e.g., owner).

The analytics performed by the change analytics system(s) 130 may include an analysis of application program interface (API) and/or software function block arguments. For example, the change analytics system(s) 130 may be able to determine that a newer version of a software code block may have a different set of arguments, as inputs, relative to a prior version of the software code block. This type of change in the software code blocks may result in any variety of cascading effects, such as upstream effects and/or downstream effects. For example, software code blocks that make function calls to the modified software code blocks may need to be modified if the arguments passed have been changed. Similarly, software code blocks that receive an output from a modified software code block may be affected if the format or nature of the output have been modified due to changes in the software code block. The argument and/or API change information may be determined by the change analytics system(s) 130 and stored in association with the software code block in the change analysis datastore 132.

In some example embodiments, the change analytics system(s) 130 may determine a metric value associated with complexity of a new software code block. For example, the change analytics system(s) 130 may determine a cyclomatic complexity value of a software code block. The cyclomatic complexity value may represent the complexity of a particular software code block based on the number of branches within the software code block. In example embodiments, the cyclomatic complexity value, or other suitable complexity metric value, of a software code block may be stored along with other change information about the software code block in the change analysis datastore 132.

In example embodiments, the cyclomatic complexity value of a software code block may be compared, by the change analytics system(s) 130, to the cyclomatic complexity value of a previous version of the software code block. For example, a change in the cyclomatic complexity may be determined for a software code block relative to previous version(s) of the software code block. This indication of the change in complexity with the new software code block may also be stored in association with the new version of the software code block in the change analysis datastore 132.

In example embodiments, the change analytics system(s) 130 may further determine a divergence complexity value of a software code block. The divergence complexity value may provide a quantitative indication of a cost associated with a software code block diverging from a master version of that software code block, such as for example a divergence from a core game engine master code. In these cases, the modified code block may operate in a manner that affects other software code blocks and, therefore, there is a cost to making these divergences from the master code block.

When the change analytics system(s) 130 generates the metric values and stores those analytics, such as in the change analysis datastore 132, the change analytics system(s) 130 may later access the change information to generate one or more reports associated with software code changes for a software project. For example, a project manager 140 and/or developer 120 may be able to query information about software code changes, via a visualization system 142, to get an understanding of the changes in the software code of the software project.

In example embodiments, stakeholders, such as developers 120, project managers 140, and others, may be able to query and receive, from the change analytics system(s) 130, a visual indication of changes associated with individual software code blocks, groups of software code blocks, software code blocks associated with specific software teams, and/or an entirety of software code blocks associated with the overall software project. In some cases, the visual data may be formatted by the change analytics system(s) 130 for display on the visualization system 142. In other cases, the queried change data may be sent to a visualization system 142, from the change analytics system(s) 130 and the visualization system 142 generates the visual representations of the change information. Any suitable software, such as POWER BI or other visualization software, may be used to display the change information associated with the software project.

In some cases, metrics may be displayed over a time period for a software project. For example, the sum of the cyclometric complexity change of all new software code blocks may be plotted as a function of time over a certain period of time. This visual display may indicate trends over time in the change in complexity of code associated with the software project. Another example display may include a sum of cyclomatic complexity change for each software team working on the software project. This may show which ones of the software teams are adding high levels of complexity to the software project. Other example displays may show which software code block changes are affecting other software code blocks, such as due to changes in the number or types of arguments. Still other example displays may indicate which software teams may be causing high levels of divergence complexity. The change analytics system(s) 130 may be configured to generate any suitable descriptions of aggregate metrics, such as averages, standard deviations, medians, modes, etc. of any of the metrics discussed herein and across any type of team and/or type of new software code (e.g., new version versus new software code, etc.).

As discussed herein, the change information may be used, such as by the change analytics system(s) 130, to make changes to resources allocated to various parts of a software development project. In this way, trends in the ongoing development of the software may provide real-time or near real-time indications of areas that may need additional support and/or resources, such as QA resources and/or additional developers 120. Additionally, the reports may be used for the purposes of change budgeting across software teams and/or for future deployments of software development resources.

Figure 2:
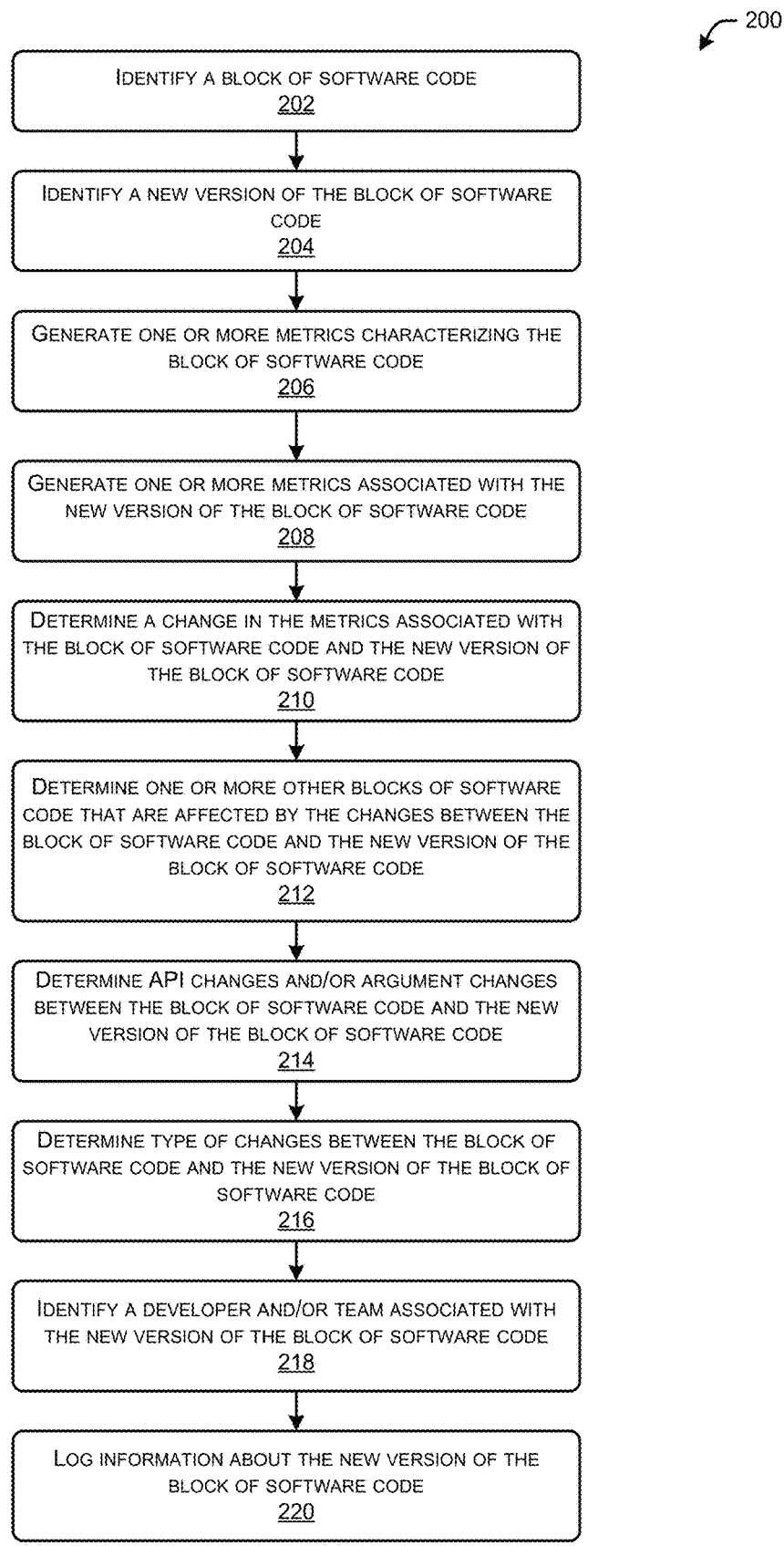
FIG. 2 illustrates a flow diagram of an example method by which change information about a new version of a block of software code is determined and logged, in accordance with example embodiments of the disclosure.

FIG. 2 illustrates a flow diagram of an example method 200 by which change information about a new version of a block of software code is determined and logged, in accordance with example embodiments of the disclosure. Method 200 may be performed by the change analytics system(s) 130, individually or in cooperation with one or more other entities of environment 100.

At block 202, a block of software code may be identified. In some cases, the change analytics system(s) 130 may periodically query the code datastore 112 and/or the software repository system(s) 110. In other cases, a change notification may be pushed to the change analytics system(s) 130, responsive to which the software code block may be identified. At block 204, a new version of the block of software code may be identified. The new version of the block of software code may be identified in a similar way as the processes of block 202.

At block 206, one or more metrics characterizing the block of software code may be generated. As discussed herein, metrics associated with complexity, divergence from a master code, and/or types of APIs may be determined. At block 208, one or more metrics associated with the new version of the block of software code may be generated. Similar metrics may be determined for the new version of the block of software code. As discussed herein, the metrics may include cyclomatic complexity and/or divergence complexity, for example.

At block 210, a change in the metrics associated with the block of software code and the new version of the block of software code may be determined. For example, a change in cyclometric complexity values and/or a change in divergence complexity values may be determined. At block 212, one or more other blocks of software code that are affected by the changes between the block of software code and the new version of the block of software code may be determined. This may involve downstream effects of the change in the software code block.

At block 214, API changes and/or argument changes between the block of software code and the new version of the block of software code may be determined. The changes in API may cause upstream effects in how the new version of the block of software code interacts with the other software code blocks, such as for function calls.

At block 216, information about the type of changes between the block of software code and the new version of the block of software code may be determined. As disclosed herein, the change analytics system(s) 130 may access and/or analyze code comments, developer notes, and/or any other metadata associated with the new version of the block of software code to determine changes from the previous version of the software block of code.

At block 218, a developer and/or team associated with the new version of the block of software code may be identified. This information may be retrieved by the change analytics system(s) 130 from the software repository system(s) 110 and/or the code datastores 112.

At block 220, information about the new version of the block of software code may be logged. This information may be logged in the change analysis datastore 132 for later retrieval, such as for the purposes of report generation and/or resource allocations.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
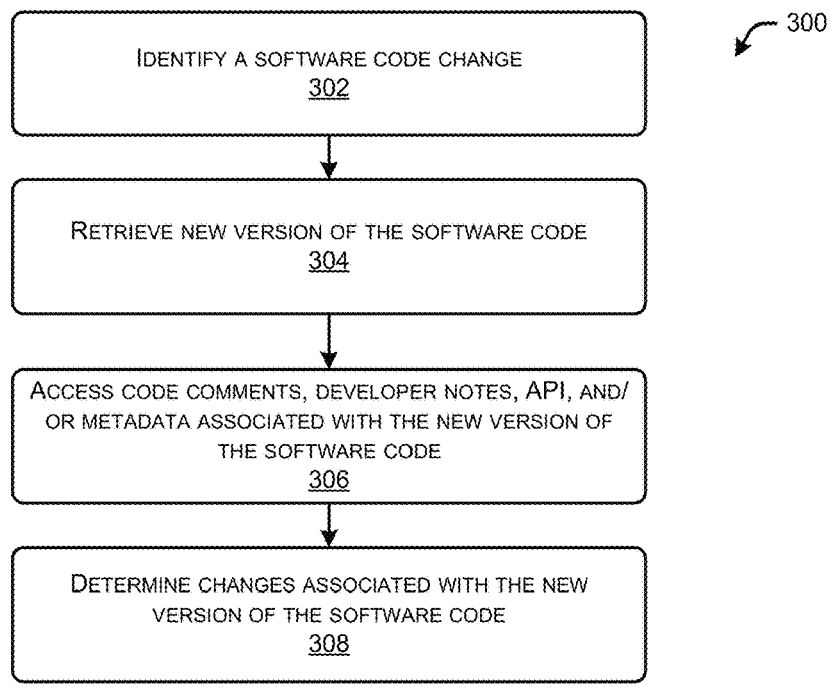
FIG. 3 illustrates a flow diagram of an example method by which changes in a new version of software code is determined, in accordance with example embodiments of the disclosure.

FIG. 3 illustrates a flow diagram of an example method 300 by which changes in a new version of software code is determined, in accordance with example embodiments of the disclosure. Method 300 may be performed by the change analytics system(s) 130, individually or in cooperation with one or more other entities of environment 100. In some example embodiments, method 300 may be an example implementation of the processes of block 216 of method 200 of FIG. 2.

At block 302, a software code change may be identified. In some cases, the change analytics system(s) 130 may periodically query the code datastore 112 and/or the software repository system(s) 110 to find new versions of software code blocks and/or new software code blocks. In other cases, a change notification may be pushed to the change analytics system(s) 130, responsive to which the software code block may be identified.

At block 304, a new version of the software code may be retrieved. In some cases, the change analytics system(s) 130 may request the new software code block, and responsive to the request, may receive the new version of the software code block, such as from the software repository system(s) 110.

At block 306, code comments, developer notes, API and/or metadata associated with the new version of the software code may be accessed. This information may be received by the change analytics system(s) 130 from the software repository system(s) 110 and/or code datastore 112. In example embodiments, the software code blocks, as received by the change analytics system, may have embedded information about the software code block, such as the nature of changes in the software code block relative to previous versions of the software code block and/or other related software code blocks. A developer may make comments (e.g., descriptive and/or metadata embedded in the software code that is not executable) within the software code.

At block 308, changes associated with the new version of the software code may be determined. The change analytics system may access comments within the software code to determine the nature of the software code blocks. In some cases, the comments in one version of software code blocks may be compared with comments from another version of the software code blocks to generate information about changes in the software code blocks from one version to another version. This type of change information between the new version of the block of software code and the previous version of the block of software code may be logged in association with the new block of software code, such as in change analysis datastore 132. The other information may include information about any application program interface (API) and/or software function block arguments, as well as any analytical data generated about the software code block.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
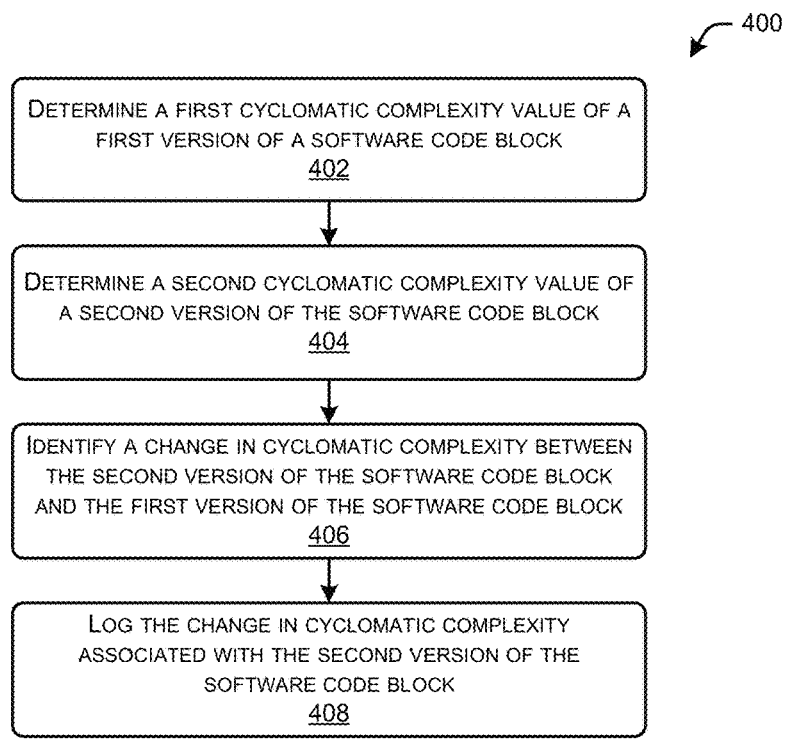
FIG. 4 illustrates a flow diagram of an example method by which a metric associated with complexity of a new version of software code is determined and/or logged, in accordance with example embodiments of the disclosure.

FIG. 4 illustrates a flow diagram of an example method 400 by which a metric associated with complexity of a new version of software code is determined and/or logged, in accordance with example embodiments of the disclosure. Method 400 may be performed by the change analytics system(s) 130, individually or in cooperation with one or more other entities of environment 100. In some example embodiments, method 400 may be an example implementation of the processes of block 206, 208, and 210 of method 200 of FIG. 2.

At block 402, a first cyclomatic complexity value of a first version of a software code block may be determined. The change analytics system(s) 130 may determine a cyclomatic complexity value of the first version of the software code block. The cyclomatic complexity value may represent the complexity of a particular software code block based on the number of branches within the software code block, such as branches that may result from if-then code, or other conditional code constructions. In some cases, the change analytics system(s) 130, may parse through the first version of software code block to identify a number of branches in the code to determine the cyclomatic complexity value. At block 404, a second cyclomatic complexity value of a second version of the software code block may be determined. This determination may be similar to the determination of cyclomatic complexity of the first version of the software code block.

At block 406, a change in the cyclomatic complexity between the second version of the software code block and the first version of the software code block. In example embodiments, a difference (e.g., subtraction) may be performed between the cyclomatic complexity value of the second version of the software code block and the cyclomatic complexity value of the first version of the software code block.

At block 408, the change in the cyclomatic complexity associated with the second version of the software code block may be logged. In example embodiments, the cyclomatic complexity value, or other suitable complexity metric value, of the second version of the software code block may be stored along with other change information about the software code block in the change analysis datastore 132.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
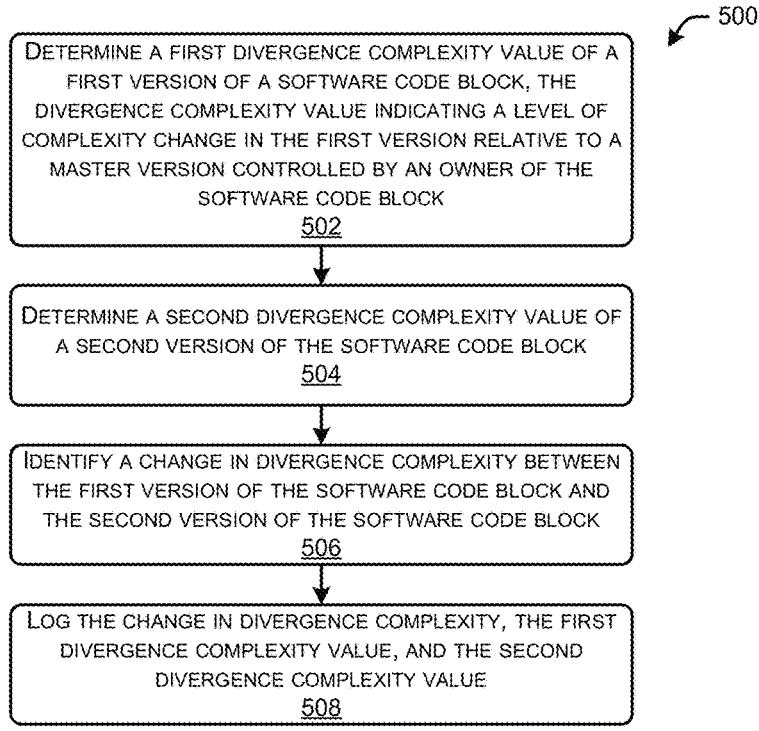
FIG. 5 illustrates a flow diagram of an example method by which a metric associated with divergence of code between two software teams is determined and/or logged, in accordance with example embodiments of the disclosure.

FIG. 5 illustrates a flow diagram of an example method 500 by which a metric associated with divergence of code between two software teams is determined and/or logged, in accordance with example embodiments of the disclosure. Method 500 may be performed by the change analytics system(s) 130, individually or in cooperation with one or more other entities of environment 100. In some example embodiments, method 500 may be an example implementation of the processes of block 206, 208, and 210 of method 200 of FIG. 2.

At block 502, a first divergence complexity value of a first version of a software code block may be determined. The divergence complexity value may indicate a level of complexity change in the first version relative to a master version controlled by an owner of the software code block. In example embodiments, the change analytics system(s) 130 may determine the divergence complexity value of the first version of the software code block by determining the differences between the first version of the software code block and a controlled master version of the software code block. The change analytics system(s) may further determine the costs associated with the divergence associated with the first version of the software code block, such as by identifying other software code blocks that may be affected by the divergence from the master version. The divergence complexity value may provide a quantitative indication of a cost associated with a software code block diverging from a master version of that software code block.

The effects of the divergence and the related costs of the divergence may include, for example, inconsistencies between different blocks of software code resulting from the divergence. In the realm of a video game development, divergences from a baseline game engine may result in relatively costly changes. For example, in a soccer video game, changing the shading and/or color of the field or the views (e.g., panning out, zooming in, etc.) may result in having to make changes to other items, such as uniforms of soccer players, the animation of the soccer players, or the like. In other words, the first version of the software code block may operate in a manner that affects other software code blocks resulting in changes having to be made in those other software code blocks. Thus, the divergence complexity value, as generated by the change analytics system, for the first version of the software code block may numerically indicate the additional complexity of a software code block diverging from the controlled version of the software code block.

At block 504, a second divergence complexity value may be determined for a second version of the software code block. This determination process may be similar to the determination of the first divergence complexity value of the first version of the software code block. At block 506, a change in the divergence complexity between the first version and the second version of the software code block may be determined. In example embodiments, a difference (e.g., subtraction) may be performed between the divergence complexity value of the second version of the software code block and the divergence complexity value of the first version of the software code block.

At block 508, the change in the divergence complexity, the first divergence complexity value, and the second divergence complexity value may be logged. In example embodiments, the divergence complexity values as determined here, or other suitable divergence metric values may be stored along with other change information about the first version and/or the second version of the software code blocks in the change analysis datastore 132.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
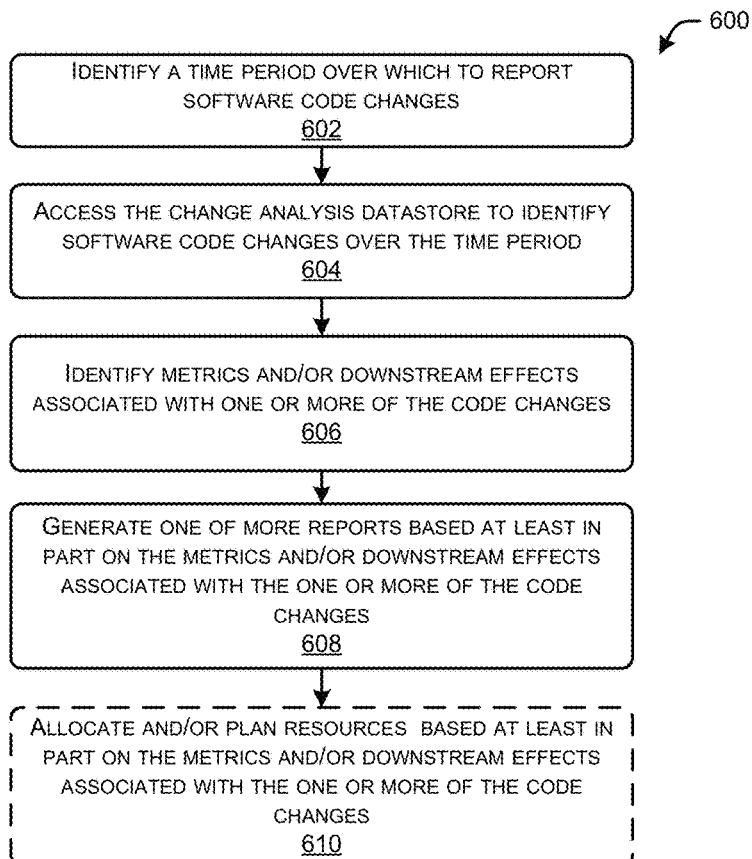
FIG. 6 illustrates a flow diagram of an example method by which one or more reports are generated and/or resources allocations are modified in response to a new version of software code, in accordance with example embodiments of the disclosure.

FIG. 6 illustrates a flow diagram of an example method 600 by which one or more reports are generated and/or resources allocations are modified in response to a new version of software code, in accordance with example embodiments of the disclosure. Method 600 may be performed by the change analytics system(s) 130, individually or in cooperation with one or more other entities of environment 100.

At block 602, a time period over which to report software code changes may be identified. The time period may be identified as a result of user input. For example, the developer 120 and/or the project manager 140 may query software changes over a time period that they specify via the visualization system 142.

At block 604, the change analysis datastore may be accessed to identify software code changes over the time period. The change analytics system(s) 130 may query all the code changes that fit the criteria (e.g., time period) identified. At block 606, metrics and/or downstream effects associated with one or more of the code changes may be identified. This change information was previously stored in the change analysis datastore 132.

At block 608, one or more reports may be generated based at least in part on the metrics and/or downstream effects associated with the one or more of the code changes. To generate the report, the metrics over a period of time may need to be aggregated in various ways. For example, a sum of all the cyclomatic complexities over the time period may be performed. Alternatively, other statistical aggregations (e.g., mean, median, mode, binning, etc.) may be performed to provide an aggregate idea of the change metrics data over the time period. Additionally, data may be separated by developers and/or teams.

At block 610, optionally, resources may be allocated and/or planned based at least in part on the metrics and/or downstream effects associated with the one or more of the code changes. Trends in the ongoing development of the software may provide real-time or near real-time indications of areas that may need additional support and/or resources. For example, areas, sets of software code blocks, and/or software teams that have relatively high levels of increase in complexity may be allocated additional QA testing resources, such as additional testers and/or testing bandwidth, to check for bugs in the new software code blocks. As another example, areas of development where there are relatively high numbers and impact of software code changes may be allocated additional software developers 120 and/or other personnel to better streamline the use of available resources and be proactive in assigning resources to the greatest current needs. The change information may also be used for planning and budgeting purposes. For example, various software teams of a software project may be allocated a certain amount of divergence complexity budget that they must stay within. This budget can be tracked, such as by a project manager 140, and if changes are needed to the budget, such changes may be made. In another example, tracking the changes in one software project may provide learning that can be used on other software projects to better allocate resources and/or manage various parts of the software project.

In some example embodiments, if a divergence complexity budget of a team and/or individual is approached or exceeded, the change analytics system(s) 130 may generate an alert to notify the software team and/or others to the possibility of exceeding the divergence complexity budget. In some cases, if cyclomatic complexity for a certain software team or developer 120 rises beyond a threshold, then the change analytics system(s) 130 may again generate an alert to notify the software team and/or others. In some cases, if the modifications to a software code block causes the associated software team to exceed their divergence complexity budget, then the change analytics system(s) 130 may prevent that software code block from being incorporated into the code base without further review and/or the change analytics system(s) 130 may generate an alert and/or flag the software code block.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
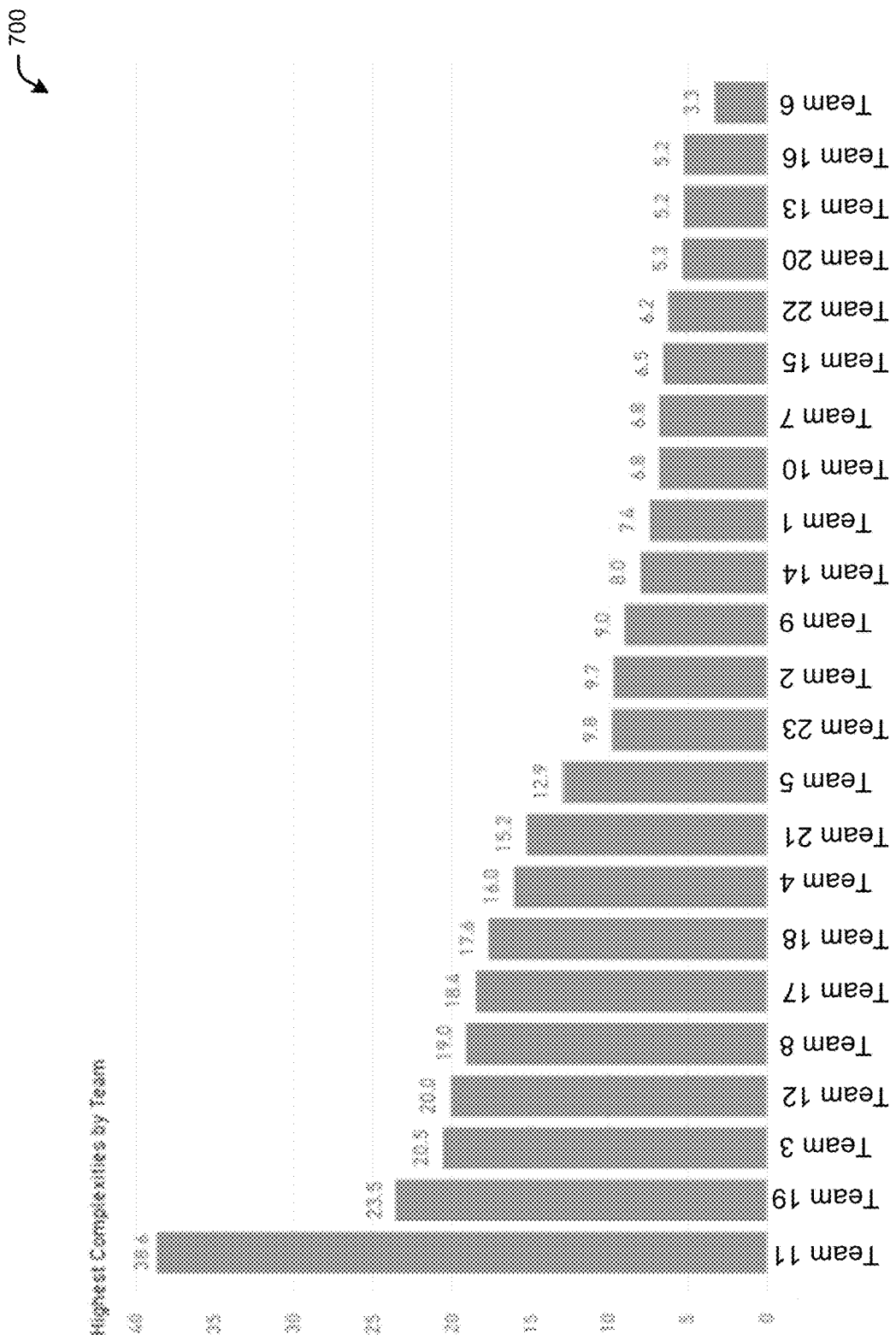
FIG. 7 illustrates a chart showing example team-level changes in cyclomatic complexity over a time period, in accordance with example embodiments of the disclosure.

FIG. 7 illustrates a chart 700 showing example team-level changes in cyclomatic complexity over a time period, in accordance with example embodiments of the disclosure. Although shown here as "Team 1," "Team 2," etc., software teams, as discussed herein, may pertain to organizational and/or functional groups of software developers and/or other personnel and resources. For example, a particular video game development project may include a rendering team, an animation team, a character development team, an audio team, a physics team, a game engine team, combinations thereof, or the like. Chart 700 may show which teams are generating high levels of complexity and this information can be used for project planning. For example, a project manager 140 and/or the change analytics system(s) 130 may recommend proving greater resources to Team 11 due to it having to deal with high levels of complexity.

Figure 8:
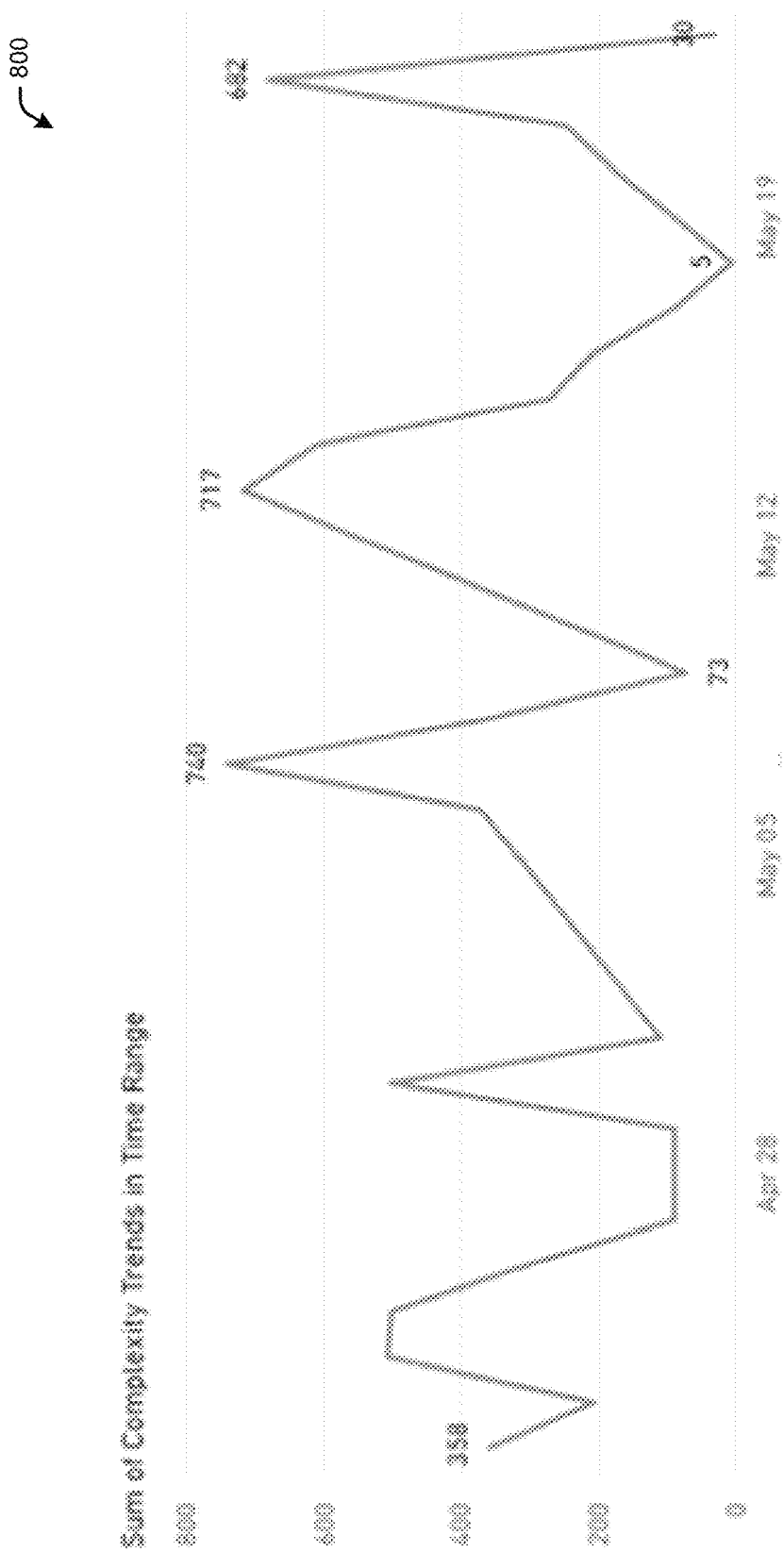
FIG. 8 illustrates a chart showing team and/or project level changes in cyclomatic complexity over time, in accordance with example embodiments of the disclosure.

FIG. 8 illustrates a chart 800 showing project level changes in cyclomatic complexity over time, in accordance with example embodiments of the disclosure. The time range of this chart may be selectable, such as by user input via the visualization system 142. A project manager may be able to view this chart 800 and manage the software development project by identifying the periods of high and/or low risks in the new software code blocks being developed.

Figure 9:
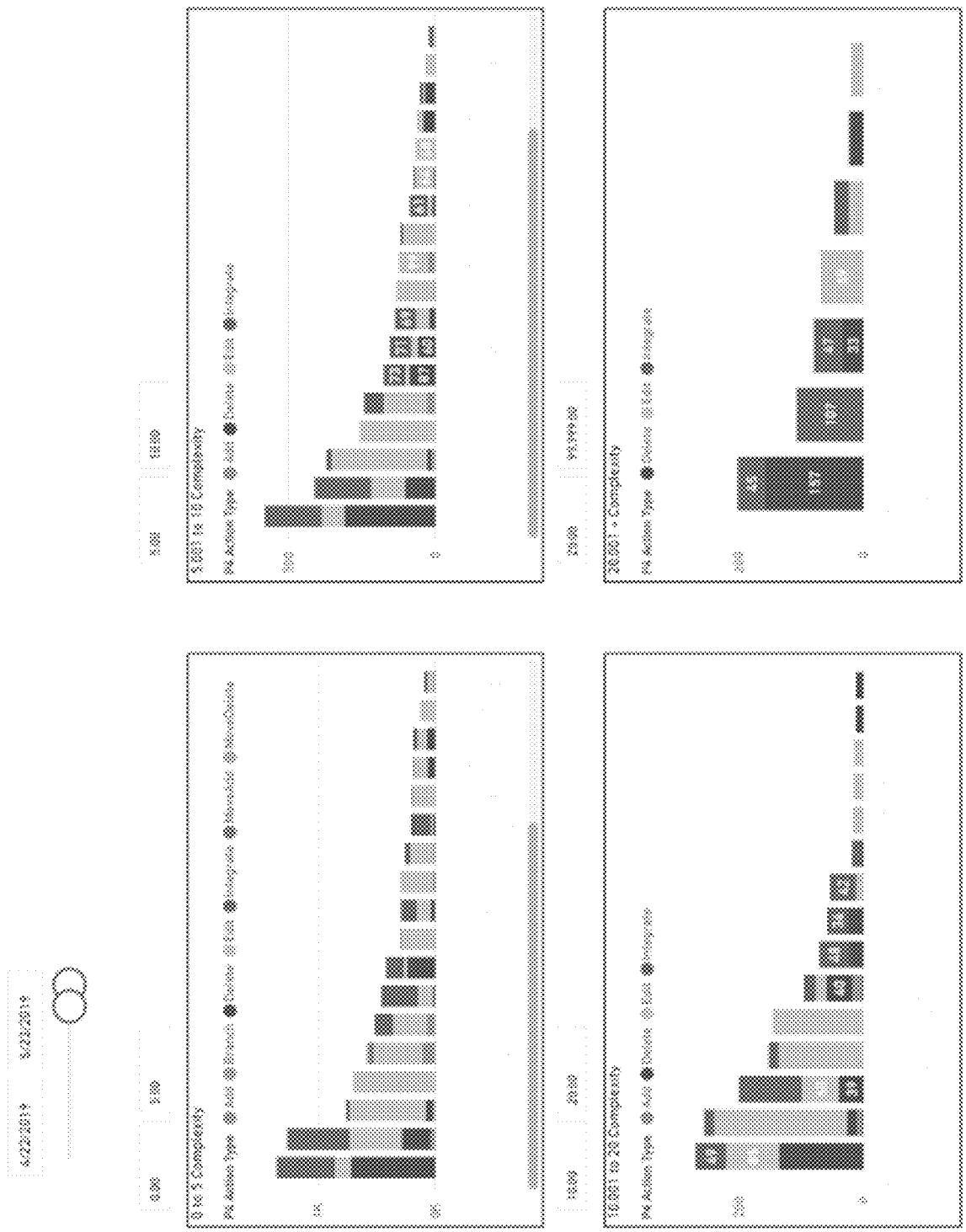
FIG. 9 illustrates a chart showing example complexity changes binned into four bins and displayed by team and type of software code change, in accordance with example embodiments of the disclosure.

FIG. 9 illustrates a chart 900 showing example complexity changes binned into four bins and displayed by team and type of software code change, in accordance with example embodiments of the disclosure. In this case, the software code block level cyclomatic complexity change has been binned out to four different levels (e.g., 0 to 5, 5.001 to 10, 10.001 to 20, and 20.001+). Additionally, the data may be displayed by team and by the type of software code changes (e.g., addition, deletion, edit, and/or integration). These charts 900 may be interactive, such that a project manager 140 and/or developer 120 may be able to select one of the bars in the chart and have a display of the names of the software code blocks represented in each of the bars of the chart 900. In this way, a project manager 140 may be able to quickly focus in on high risk software code changes, such as those with 20.001+ change in cyclomatic complexity.

Figure 10:
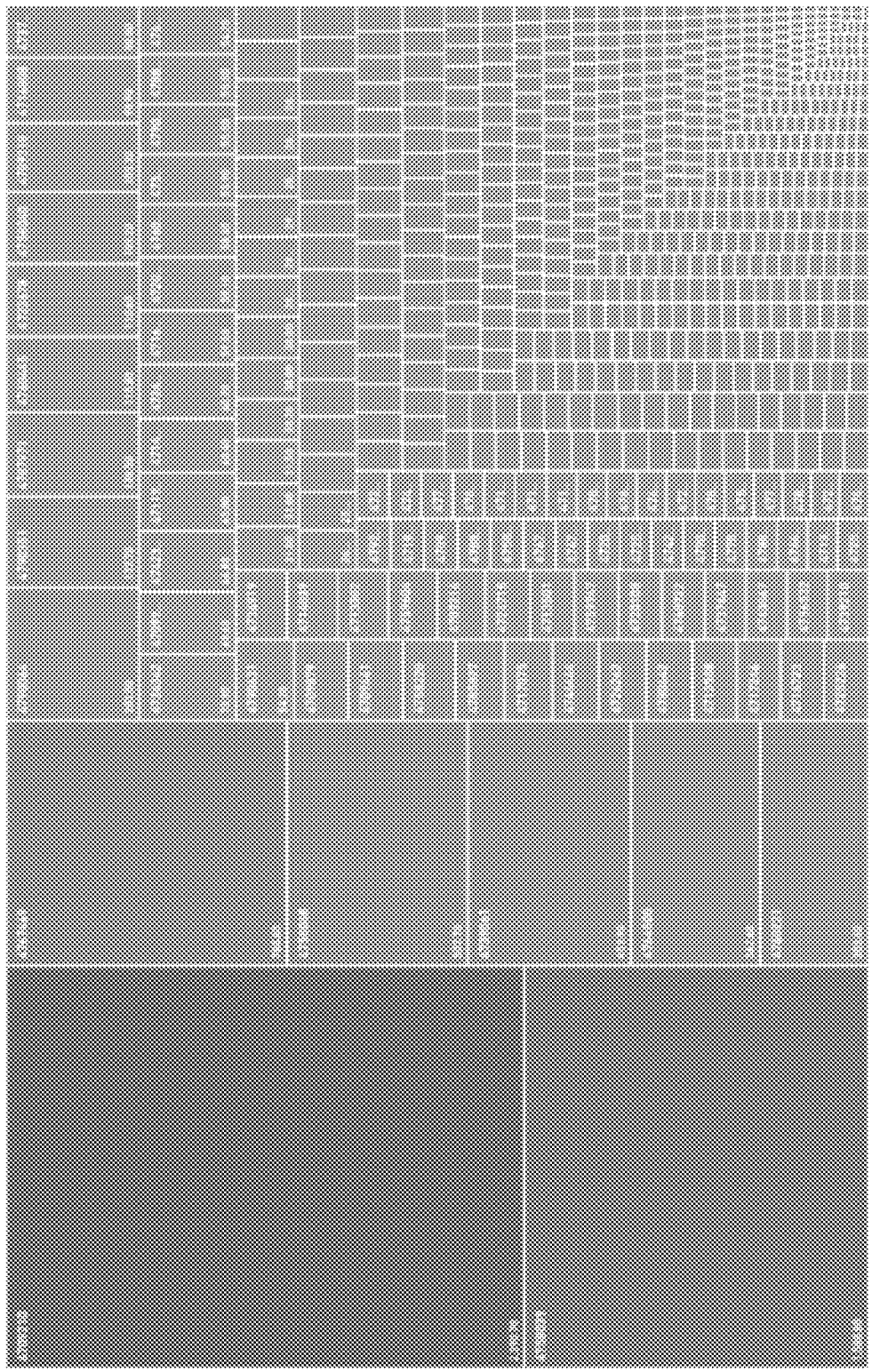
FIG. 10 illustrates a chart showing example heat map of changes in cyclomatic complexity by task, in accordance with example embodiments of the disclosure.

FIG. 10 illustrates a chart 1000 showing an example heat map of changes in cyclomatic complexity by task, in accordance with example embodiments of the disclosure. Each of the blocks represent a task pertaining to a code change in a software code block. This heat map can be used, such as by a developer 120 and/or project manager 140, to identify particularly high risk code changes, and pay closer attention to those software code blocks. For example, the large block in the top left of the chart 1000 has a cyclomatic complexity change of 2390.7, while other software code blocks have lower levels of change in cyclomatic complexity.

Figure 11:
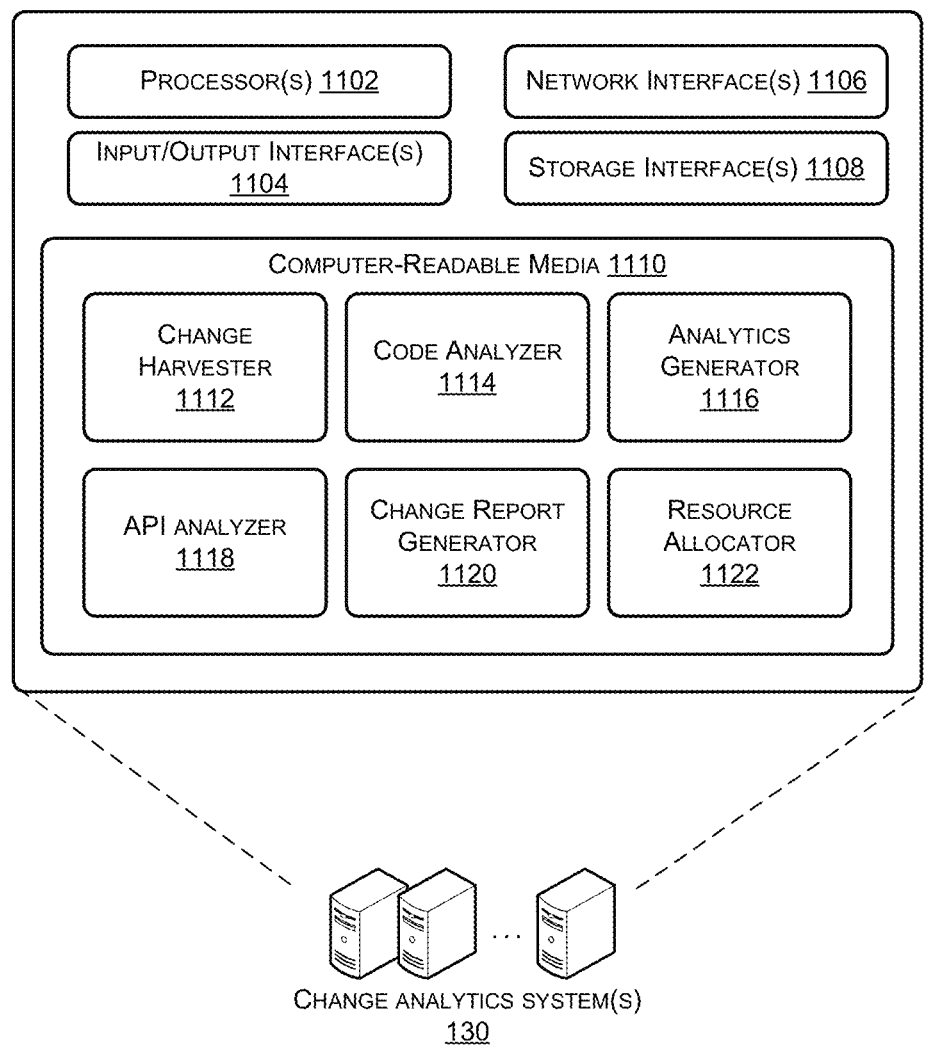
FIG. 11 illustrates a block diagram of example change analytics system(s) for managing software code changes, in accordance with example embodiments of the disclosure.

FIG. 11 illustrates a block diagram of example change analytics system(s) 130 for managing software code changes, in accordance with example embodiments of the disclosure. The change analytics system(s) 130 may include one or more processor(s) 1100, one or more input/output (I/O) interface(s) 1102, one or more network interface(s) 1104, one or more storage interface(s) 1106, and computer-readable media 1110.

In some implementations, the processors(s) 1100 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 1100 may possess its own local memory, which also may store program modules, program data, and/or one or more operating system(s). The one or more processor(s) 1100 may include one or more cores.

The one or more input/output (I/O) interface(s) 1102 may enable the change analytics system(s) 130 to detect interaction with a user and/or other system(s), such as the software repository system(s) 110 and/or the visualization system(s) 142. The I/O interface(s) 1102 may include a combination of hardware, software, and/or firmware and may include software drivers for enabling the operation of any variety of I/O device(s) integrated on the change analytics system(s) 130 or with which the change analytics system(s) 130 interacts, such as displays, microphones, speakers, cameras, switches, and any other variety of sensors, or the like.

The network interface(s) 1104 may enable the change analytics system(s) 130 to communicate via the one or more network(s). The network interface(s) 1104 may include a combination of hardware, software, and/or firmware and may include software drivers for enabling any variety of protocol-based communications, and any variety of wireline and/or wireless ports/antennas. For example, the network interface(s) 1104 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows test the change analytics system(s) 130 to transition between various standards. The network interface(s) 1104 may further enable the change analytics system(s) 130 to communicate over circuit-switch domains and/or packet-switch domains.

The storage interface(s) 1106 may enable the processor(s) 1100 to interface and exchange data with the computer-readable media 1110, as well as any storage device(s) external to the change analytics system(s) 130, such as the change analysis datastore 132.

The computer-readable media 1110 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 1110 may be implemented as computer-readable storage media (CRSM), which may be any available physical media accessible by the processor(s) 1100 to execute instructions stored on the computer-readable media 1110. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 1100. The computer-readable media 1110 may have an operating system (OS) and/or a variety of suitable applications stored thereon. The OS, when executed by the processor(s) 1100 may enable management of hardware and/or software resources of the change analytics system(s) 130.

Several functional blocks having instruction, data stores, and so forth may be stored within the computer-readable media 1110 and configured to execute on the processor(s) 1100. The computer readable media 1110 may have stored thereon a change harvester 1112, a code analyzer 1114, an analytics generator 1116, an API analyzer 1118, a change report generator 1120, and a resource allocator 1122. It will be appreciated that each of the functional blocks 1112, 1114, 1116, 1118, 1120, 1122, may have instructions stored thereon that when executed by the processor(s) 1100 may enable various functions pertaining to the operations of the change analytics system(s) 130.

The instructions stored in the change harvester 1112, when executed by the processor(s) 1100, may configure the change analytics system(s) 130 to obtain software code blocks from one or more software repository systems 110 and/or code datastores 112. The processor(s) 1100 may periodically check for new software code blocks and/or the processor(s) may receive notification of any changes, such as from the software repository systems 110, indicating new software code blocks.

The instructions stored in the code analyzer 1114, when executed by the processor(s) 1100, may configure the change analytics system(s) 130 to analyze code, change reports, and/or other metadata to determine changes between different versions of software code blocks.

The instructions stored in the analytics generator 1116, when executed by the processor(s) 1100, may configure the change analytics system(s) 130 to generate one or more analytics related to a software code block, such as cyclomatic complexity, divergence complexity, and/or differences thereof.

The instructions stored in the API analyzer 1118, when executed by the processor(s) 1100, may configure the change analytics system(s) 130 to determine changes in APIs and/or arguments of various versions of software code blocks.

The instructions stored in the change report generator 1120, when executed by the processor(s) 1100, may configure the change analytics system(s) 130 to generate one or more change reports by aggregating data, such as change data stored in the change analysis datastore 132.

The instructions stored in the resource allocator 1122, when executed by the processor(s) 1100, may configure the change analytics system(s) 130 to recommend changes in resources based on current data for changes in software code blocks. For example, engineering, financial, QA resources, or the like may be modified based at least in part on the trends of the change information.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
    one or more processors; and
    one or more computer-readable media storing computer-executable instructions that, when executed by the one or more processors, cause the one or more processors to:
        identify a first version of a software code block;
        identify a second version of the software code block;
        determine a change in a complexity metric value between the first version of the software code block and the second version of the software code block;
        identify that the software code block is associated with a software team;
        recommend modification, based at least in part on a change in the complexity metric value, to a resource associated with the software team, wherein the resource includes a software developer resource;
            identify a time period over which to determine the change in complexity associated with the software team, wherein to determine the change in complexity associated with the software team comprises determining that a second change in complexity value associated with a second software code block and the change in complexity value associated with the software code block occurred during the time period;
            determine the second change in complexity value associated with the second software code block, the second software code block associated with the software team;
            determine, based at least in part on the change in complexity metric value and the second change in complexity metric value, a change in complexity associated with the software team over the time period; and
        generate a report indicating the change in complexity associated with the software team.

2. The system of claim 1, wherein the computer-executable instructions further cause the one or more processors to:
    determine one or more differences between the first version of a software code block and the second version of a software code block, wherein the change in the complexity metric value is based at least in part on the one or more differences between the first version of a software code block and the second version of a software code block.

3. The system of claim 1, wherein the computer-executable instructions further cause the one or more processors to:
    determine a first cyclomatic complexity value associated with the first version of the software code block; and
    determine a second cyclomatic complexity value associated with the second version of the software code block, wherein the change in a complexity metric value is based at least in part on the first cyclomatic complexity value and the second cyclomatic complexity value.

4. The system of claim 1, wherein the computer-executable instructions further cause the one or more processors to:
    store the change in complexity metric value in association with an identifier of the second version of the software code block and the software team; and
    generate a report indicating the change in complexity metric value and indicating the software team.

5. The system of claim 1, wherein the computer-executable instructions further cause the one or more processors to:
    determine a second software code block that is affected by the second version of the software code block; and
    generate a report indicating the second software code block and indicating the software team.

6. The system of claim 1, wherein recommend modification to the resource associated with the software team is further based at least in part on the change in complexity associated with the software team.

7. A method, comprising:
    identifying a first version of a software code block;
    identifying a second version of the software code block;
    determining a change in a complexity metric value between the first version of the software code block and the second version of the software code block;
    identify that the software code block is associated with a software team; and
    recommending modification, based at least in part on a change in the complexity metric value, to a resource associated with the software team, wherein the resource includes a quality assurance resource;
    identifying a time period over which to determine the change in complexity associated with the software team, wherein to determine the change in complexity associated with the software team comprises determining that a second change in complexity value associated with a second software code block and the change in complexity value associated with the software code block occurred during the time period;

determining the second change in complexity value associated with the second software code block, the second software code block associated with the software team;

determining, based at least in part on the change in complexity metric value and the second change in complexity metric value, a change in complexity associated with the software team over the time period; and generating a report indicating the change in complexity associated with the software team.

8. The method of claim 7, further comprising:

determining one or more differences between the first version of a software code block and the second version of a software code block, wherein the change in the complexity metric value is based at least in part on the one or more differences between the first version of a software code block and the second version of a software code block.

9. The method of claim 8, further comprising:

storing an indication of the one or more differences in association with an identifier of the second version of the software code block.

10. The method of claim 7, further comprising:

determining that there is a change in a number of arguments of the second version of the software code block relative to the first version of the software code block; and storing an indication of the change in the number of arguments in association with an identifier of the second version of the software code block.

11. The method of claim 7, further comprising:

determining a first cyclomatic complexity value associated with the first version of the software code block; and determining a second cyclomatic complexity value associated with the second version of the software code block, wherein the change in a complexity metric value is based at least in part on the first cyclomatic complexity value and the second cyclomatic complexity value.

12. The method of claim 7, further comprising:

storing the change in complexity metric value in association with an identifier of the second version of the software code block and the software team; and generating a report indicating the change in complexity metric value and indicating the software team.

13. The method of claim 7, further comprising:

determining a second software code block that is affected by the second version of the software code block; and generating a report indicating the second software code block and indicating the software team.

14. The method of claim 7, further comprising:

determining, based at least in part on a change in one or more arguments of the software code block between the first version and the second version, a number of other software code blocks affected by the second version of the software code block.

15. The method of claim 7, wherein recommend modification to the resource associated with the software team is further based at least in part on the change in complexity associated with the software team.

* * * * *